(12) United States Patent
Sagae et al.

(10) Patent No.: US 9,232,477 B2
(45) Date of Patent: Jan. 5, 2016

(54) TERMINAL APPARATUS, BASE STATION APPARATUS, MOBILE COMMUNICATION SYSTEM, AND TRANSMISSION MODE SETTING METHOD

(75) Inventors: Yuta Sagae, Tokyo (JP); Hiroyuki Ishii, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 470 days.

(21) Appl. No.: 13/261,497

(22) PCT Filed: Apr. 28, 2011

(86) PCT No.: PCT/JP2011/060477
§ 371 (c)(1),
(2), (4) Date: Jan. 8, 2013

(87) PCT Pub. No.: WO2011/136372
PCT Pub. Date: Nov. 3, 2011

(65) Prior Publication Data
US 2013/0102353 A1    Apr. 25, 2013

(30) Foreign Application Priority Data

Apr. 30, 2010 (JP) ................................. 2010-105994
May 12, 2010 (JP) ................................. 2010-110378

(51) Int. Cl.
*H04B 1/00* (2006.01)
*H04B 7/00* (2006.01)
(Continued)

(52) U.S. Cl.
CPC ............ *H04W 52/04* (2013.01); *H04L 5/0091* (2013.01); *H04L 27/0008* (2013.01); *H04W 52/367* (2013.01); *H04W 8/245* (2013.01)

(58) Field of Classification Search
CPC ....................................................... H04B 1/406
USPC ........................................ 455/500, 73, 552.1
See application file for complete search history.

(56) References Cited

U.S. PATENT DOCUMENTS 6,091,939 A * 7/2000 Banh ............................ 455/102
2006/0121928 A1 6/2006 Itsuki
(Continued)

FOREIGN PATENT DOCUMENTS

JP 2006-191532 A 7/2006
JP 2007-053738 A 3/2007
(Continued)

OTHER PUBLICATIONS

Office Action in counterpart Chinese Patent Application No. 201180020986.3 issued on Jan. 6, 2014 (16 Pages).
(Continued)

Primary Examiner — Tilahun B Gesesse
(74) Attorney, Agent, or Firm — Osha Liang LLP

(57) ABSTRACT

A terminal apparatus that performs radio communication with a base station apparatus in a mobile communication system, including: a transmission mode information receiving unit configured to receive transmission mode information, from the base station apparatus, corresponding to a transmission mode that should be set in the terminal apparatus; a transmission mode setting unit configured to set the terminal apparatus to the transmission mode if the terminal apparatus can perform radio transmission in the transmission mode corresponding to the transmission mode information received by the transmission mode receiving unit; and a radio transmission unit configured to perform radio transmission in the transmission mode.

29 Claims, 9 Drawing Sheets

(51) Int. Cl.
*H04W 72/00* (2009.01)
*H04W 52/04* (2009.01)
*H04W 52/36* (2009.01)
*H04L 5/00* (2006.01)
*H04L 27/00* (2006.01)
*H04W 8/24* (2009.01)

(56) References Cited

U.S. PATENT DOCUMENTS

| | | | |
|---|---|---|---|
| 2008/0189334 A1* | 8/2008 | Mathur | 707/104.1 |
| 2011/0034201 A1 | 2/2011 | Hamada et al. | |
| 2011/0281612 A1 | 11/2011 | Ishii et al. | |
| 2013/0028214 A1* | 1/2013 | Imamura | H04L 5/001 370/329 |

FOREIGN PATENT DOCUMENTS

| | | |
|---|---|---|
| JP | 2008-288954 A | 11/2008 |
| JP | 2010-041428 A | 2/2010 |
| KR | 20100015577 A | 2/2010 |
| WO | 2008/123148 A1 | 10/2008 |
| WO | 2009/133740 A1 | 11/2009 |
| WO | 2009/157390 A1 | 12/2009 |
| WO | 2010032773 A1 | 3/2010 |

OTHER PUBLICATIONS

International Search Report issued in PCT/JP2011/060477 mailed on Jun. 14, 2011 (2 pages).
3GPP TS 25.304 V9.1.0; "3rd Generation Partnership Project; Technical Specification Group Radio Access Network; User Equipment (UE) procedures in idle mode and procedures for cell reselection in connected mode (Release 9)"; Mar. 2010 (50 pages).
3GPP TS 36.304 V9.1.0; "3rd Generation Partnership Project; Technical Specification Group Radio Access Network; Evolved Universal Terrestrial Radio Access (E-UTRA); User Equipment (UE) procedures in idle mode (Release 9)"; Dec. 2009 (31 pages).
3GPP TS 36.300 V9.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)"; Dec. 2009 (178 pages).
3GPP TS 36.101 V9.3.0; "3rd Generation Partnership Project; Technical Specification Group Radio Access Network; Evolved Universal Terrestrial Radio Access (E-UTRA); User Equipment (UE) radio transmission and reception (Release 9)"; Mar. 2010 (172 pages).
Japanese Office Action for Application No. 2010-110378, mailed on Oct. 16, 2012 (4 pages).
Patent Abstracts of Japan for Japanese Publication No. 2007-053738, publication date Mar. 1, 2007 (1 page).
Written Opinion issued in PCT/JP2011/060477 mailed Jun. 14, 2011 (3 pages).
Office Action for Japanese Application No. 2010-110378 dated Jan. 15, 2013, with English translation thereof (2 pages).
Office Action issued in counterpart Korean Patent Application No. 10-2012-7030325 dated Nov. 20, 2014 (5 pages).
Office Action issued in counterpart Chinese Patent Application No. 201180020986.3 dated Oct. 10, 2014 (11 pages).
Office Action in corresponding Australian Application No. 2011245991, dated Oct. 9, 2014 (3 pages).
Office Action issued in counterpart Korean Patent Application No. 10-2012-7030325 dated May 12, 2014 (10 pages).
Office Action in counterpart Chinese Patent Application No. 201180020986.3, dated May 28, 2015 (9 pages).

* cited by examiner

TERMINAL APPARATUS, BASE STATION APPARATUS, MOBILE COMMUNICATION SYSTEM, AND TRANSMISSION MODE SETTING METHOD

TECHNICAL FIELD

The present invention relates to a technique for setting a transmission mode to a terminal apparatus such as a mobile terminal and customer premises equipment and the like used in a mobile communication system.

BACKGROUND ART

Currently, standardization on mobile communication systems is in progress in 3GPP and the like, and standards such as LTE are being drafted. In the standard such as the LTE, a terminal apparatus called UE (User Equipment) is designed and manufactured so as to meet the standard defined by a standard-setting organization and the like, and the terminal apparatus operates in conformity to the standard.

Also, a standard, that extends the LTE, such as the LTE-A (LTE-Advanced) and the like is being studied. A terminal apparatus conforming to such a standard includes functions that are more sophisticated and complicated than those of the terminal apparatus in the conventional standard, and it is assumed that radio transmission power of the terminal apparatus increases in order to increase transmission speed and to stabilize radio quality. Also, since the terminal apparatus includes sophisticated and complicated radio communication functions, there is a possibility that radio transmission requirements (to be also referred to as RF conditions) such as out-of-band radiation emitted to the outside by the terminal apparatus when performing radio communication are relaxed.

PRIOR ART DOCUMENTS

[Non-patent document 1] 3GPP TS 25.304 V9.1.0 (2010-03)
[Non-patent document 2] 3GPP TS 36.304 V9.1.0 (2010-03)
[Non-patent document 3] 3GPP TS 36.300 V9.2.0 (2009-12)

SUMMARY OF THE INVENTION

Problem to be Solved by the Invention

As mentioned above, in the future, it is considered that terminal apparatuses supporting the maximum transmission power greater than the maximum transmission power defined in the current standard are standardized and commercialized.

A terminal apparatus used for mobile communications is also called a mobile station. Basically, a user can freely carry the terminal apparatus anywhere in the world. However, since radio transmission conditions such as transmission power are stipulated by laws and regulations for each country and for each region, there is a possibility that, in a part of regions, the above-mentioned terminal apparatus supporting the large transmission power does not comply with stipulations on radio transmission condition.

Also, as mentioned before, as to the terminal apparatus complying to the standard such as the LTE-A (LTE-Advanced), there is a possibility that requirements on out-of-band radiation, such as ACLR (Adjacent Channel Leakage Ratio) and spurious emission, that are radio communication conditions other than the transmission power are relaxed. Also in this point, there is a possibility that the terminal apparatus does not conform to stipulations on radio communication in a part of regions.

As conventional techniques for controlling transmission power of the terminal apparatus, there is a technique for reporting a maximum transmission power to the terminal apparatus by using broadcast information (system information) transmitted by a base station apparatus, and there is a transmission power control technique by Open/Closed loop. In order to cause the terminal apparatus to operate with a transmission power in conformity with stipulations of a region, it can be considered to perform control so as to decrease the transmission power of the terminal apparatus, which supports a large transmission power, by using the above-mentioned conventional technique.

However, even though control only for the maximum transmission power is performed using the conventional technique, other conditions (such as ACLR and spurious emission) do not necessarily conform to regulations of the region, so the control by using the conventional technique is not sufficient. In addition, in the case when performing control only for the maximum transmission power using the conventional technique, there is no guarantee that the terminal apparatus operates while satisfying other requirements (tolerance of transmission power, ACLR, spurious, and the like) defined in the standard such as the LTE-A (LTE-Advanced) and the like.

That is, in the technique in which individual parameters such as the maximum transmission power are reported to the terminal apparatus, it is difficult to control the terminal apparatus such that the terminal apparatus performs radio communication operation while satisfying the standard and satisfying the stipulations of the region.

The present invention is contrived in view of the above-mentioned points, and an object is to provide a technique that enables the terminal apparatus used in the mobile communication system to operate in a specific transmission mode among a plurality of transmission modes, by defining the plurality of types of transmission modes corresponding to radio transmission requirements in the terminal apparatus such as the maximum transmission power and the out-of-band radiation and the like.

Means for Solving the Problem

In order to solve the above-mentioned problem, according to an embodiment of the present invention, a terminal apparatus that performs radio communication with a base station apparatus in a mobile communication system includes:

a transmission mode information receiving unit configured to receive transmission mode information, from the base station apparatus, corresponding to a transmission mode that should be set in the terminal apparatus;

a transmission mode setting unit configured to set the terminal apparatus to the transmission mode if the terminal apparatus can perform radio transmission in the transmission mode corresponding to the transmission mode information received by the transmission mode receiving unit; and a radio transmission unit configured to perform radio transmission in the transmission mode.

Also, according to an embodiment of the present invention, a base station apparatus that performs radio communication with a terminal apparatus in a mobile communication system includes:

a transmission mode information storing unit configured to store transmission mode information corresponding to a transmission mode that should be set in the terminal apparatus; and a transmission mode information transmission unit configured to read the transmission mode information from the transmission mode information storing unit, and to transmit the transmission mode information to the terminal apparatus.

Effect of the Present Invention

According to the invention, it becomes possible to cause a terminal apparatus used in a mobile communication system to operate in a specific transmission mode among a plurality of transmission modes, and for example, it becomes possible to set a terminal apparatus, belonging to a base station apparatus installed in a region, to a transmission mode complying with stipulations of the region.

EMBODIMENTS FOR CARRYING OUT THE INVENTION

Embodiments of the present invention are described with reference to figures.

First Embodiment

System Configuration

System Operation

Figure 1:
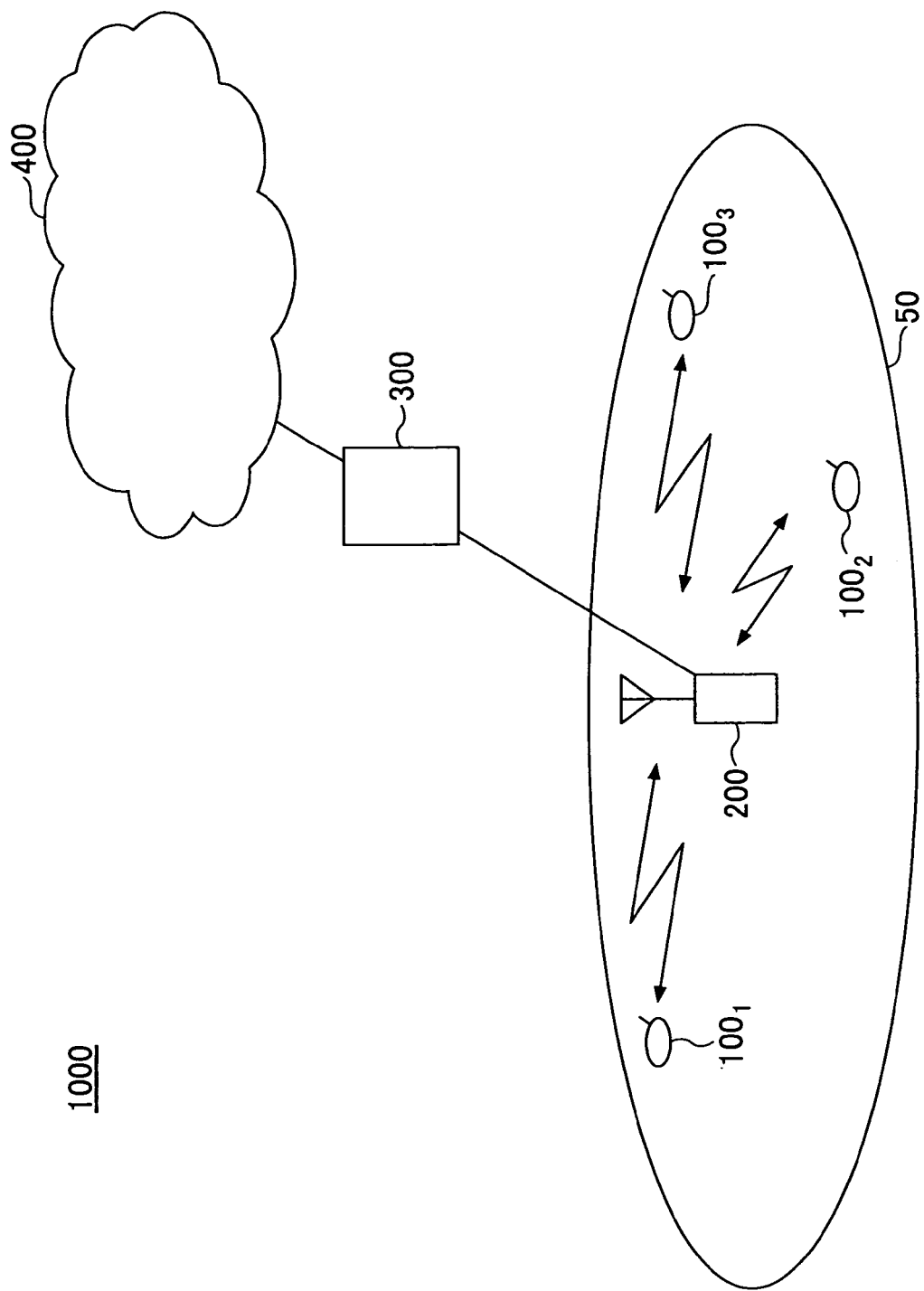
FIG. 1 is a block diagram of a mobile communication system 1000 of an embodiment of the present invention.

FIG. 1 shows a configuration of a mobile communication system 1000 of an embodiment of the present invention. The mobile communication system 1000 of the present embodiment is assumed to be a mobile communication system of LTE and LTE-Advanced and the like. But, the mobile communication system 1000 of the present embodiment is not limited to these.

As shown in FIG. 1, this mobile communication system 1000 includes a base station apparatus (eNB: eNodeB) 200, and a plurality of terminal apparatuses (UE: User Equipment) $100_n$ ($100_1$, $100_2$, $100_3$, ... $100_n$, n is an integer of n>0) that communicate with the base station apparatus 200 by radio. The base station apparatus 200 forms a cell 50, and is connected to an upper station. The upper station is connected to a core network 400. For example, the upper station may be configured to include an access gateway apparatus 300.

Although FIG. 1 shows one base station apparatus 200 and one cell 50 for convenience of drawing, there are a plurality of base station apparatuses and a plurality of cells in reality. Since the terminal apparatuses ($100_1$, $100_2$, $100_3$, ... $100_n$) have the same configuration, function and state, a particular one (to be referred to as a terminal apparatus 100) is described for the terminal apparatuses.

Figure 2:
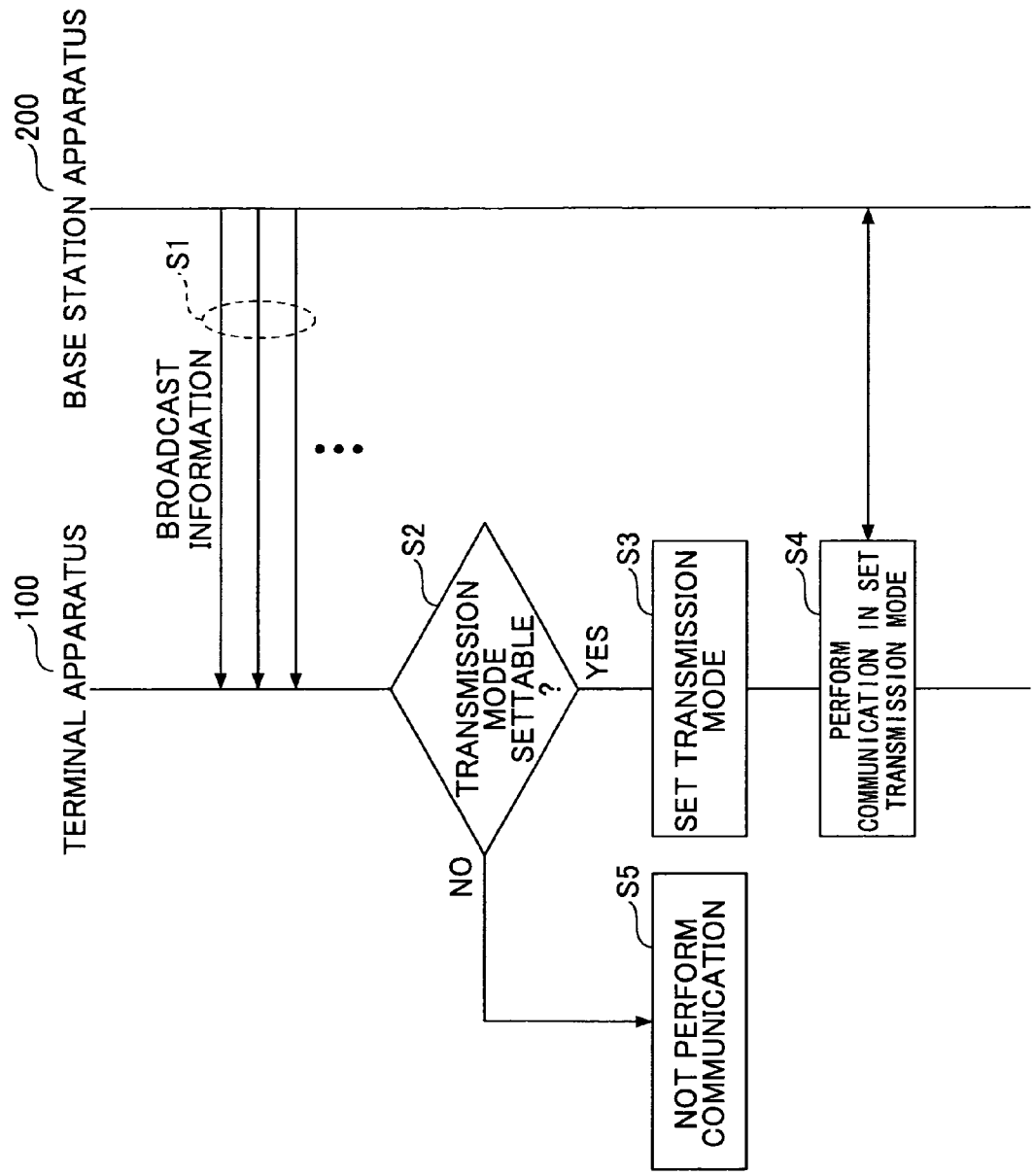
FIG. 2 is a sequence chart for explaining outline of operation of a system in a first embodiment.

Next, an outline of operation of the system in the first embodiment is described with reference to the sequence chart of FIG. 2.

The base station apparatus 200 periodically transmits transmission mode information, as broadcast information (system information), to the terminal apparatus 100 in the cell 50 (step 1).

The terminal apparatus 100 that receives the broadcast information including the transmission mode information extracts the transmission mode information from the broadcast information. If a transmission mode that can be used in the region can be set in the terminal apparatus 100 based on the transmission mode information (Yes in step 2), the terminal apparatus 100 makes settings into the transmission mode (step 3), and performs communication in the established transmission mode (step 4). If the transmission mode, corresponding to the received transmission mode information, cannot be set in the terminal apparatus (No in step 2), the terminal apparatus 100 does not perform communication (step 5).

In the present embodiment, in a case where there is no notification of the transmission mode information from the base station apparatus 200, the terminal apparatus 100 starts communication in a transmission mode corresponding to pre-determined transmission mode information stored in a storage part of the terminal apparatus 100.

In the embodiment of the present invention, it is assumed that a plurality of kinds of transmission modes are defined by a standard-setting organization and the like in consideration of stipulations on radio communication in each country and in each region. Each transmission mode is associated with radio transmission requirements, for the terminal apparatus, such as maximum transmission power, Power Class, size of tolerance, out-of-band emission such as ACLR, spurious, p-Max and the like. In addition, standard-setting organizations and the like also define reception performances of the terminal apparatus. Thus, the reception performances may be associated with the transmission mode as reception performance conditions. That is, the transmission mode information may be associated with reception performance conditions. The reception performance condition may be a minimum received power value or RSRP value, that can be received, corresponding to a reference modulation scheme or transmission method, or may be a minimum CINR value or RSRQ value, or the like. Also, by reporting the reception performance condition by including it in the transmission mode information, the terminal apparatus may operate such that the terminal apparatus performs reception operation by selecting a reception scheme that satisfies the reception performance condition added to the transmission mode information, in the case where the terminal apparatus supports various reception methods inside the terminal apparatus. The plurality of reception methods may be, for example, types of MIMO reception methods using a plurality of antennas, or may be the number of maximum use bands in the case where the terminal apparatus performs communication by using a plurality of bands. For example, the transmission mode information is a number (1, 2, 3, ... and the like) for identifying a transmission mode.

In addition, a transmission mode that should not be used in the region may be defined as a transmission mode, so that transmission mode information corresponding to the transmission mode may be reported from the base station apparatus 200 to the terminal apparatus 100. When the terminal apparatus 100 receives such transmission mode information, the terminal apparatus 100 can perform communication by using a transmission mode corresponding to transmission mode information that is not reported, among transmission modes that the terminal apparatus 100 can use.

In the base station apparatus 200, transmission mode information corresponding to a region where the base station apparatus 200 is installed is set beforehand. The base station apparatus 200 transmits this preset transmission mode information to the terminal apparatus 100. Then, the terminal apparatus 100 is set to a particular transmission mode based on transmission mode information received from the base station apparatus 200, and the terminal apparatus 100 performs communication that satisfies the radio communication requirements, associated with the transmission mode, such as maximum transmission power, Power Class, size of tolerance, out-of-band emission amount such as ACLR and spurious emission and the like, and p-Max, and the like. Also, as to receiving sensitivity and the modulation scheme, the terminal apparatus 100 performs communication using them corresponding to the transmission mode information.

(Configuration and Operation of Each Apparatus)

Figure 3:
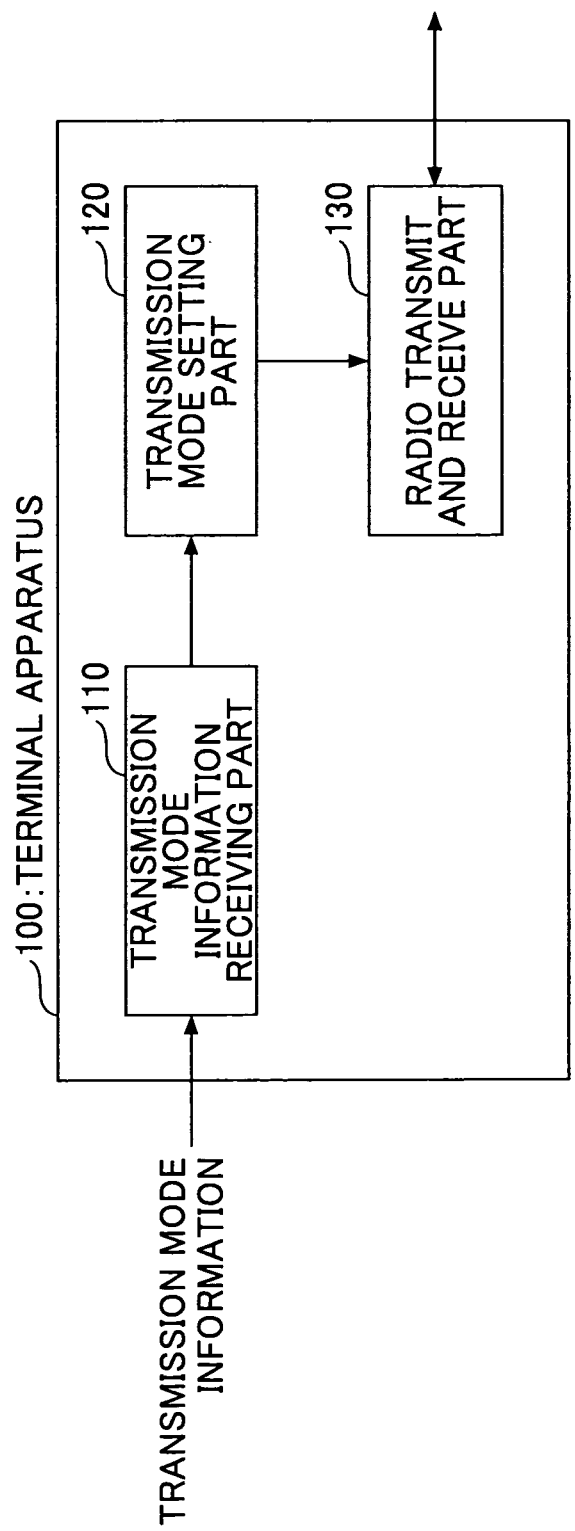
FIG. 3 is a functional block diagram of a terminal apparatus 100.

FIG. 3 shows a functional block diagram of the terminal apparatus 100. As shown in FIG. 3, the terminal apparatus 100 includes a transmission mode information receiving part 110, a transmission mode setting part 120, and a radio transmit and receive part 130. FIG. 3 shows only functional parts related to the present invention, and it is needless to say that the terminal apparatus 100 includes other functions necessary for performing radio communication as a terminal apparatus in a mobile communication system complying with LTE and the like.

The transmission mode information receiving part 110 is a functional part that receives broadcast information (system information block, for example) from the base station apparatus 200, extracts transmission mode information from the broadcast information, and passes the transmission mode information to the transmission mode setting part 120.

The transmission mode setting part 120 is a functional part that checks where a transmission mode corresponding to the transmission mode information received from the transmission mode information receiving part 110 can be set in the terminal apparatus 100, and sets the terminal apparatus 100 to the transmission mode if the mode can be set in the terminal apparatus 100.

The radio transmit and receive part 130 is a functional part that performs radio communication of a signal so as to satisfy the radio transmission requirements and reception performance conditions corresponding to the transmission mode.

Regarding the checking performed by the transmission mode setting part 120 to check whether transmission mode can be set, for example, the terminal apparatus 100 has one or a plurality of pieces of transmission mode information corresponding to one or a plurality of transmission modes settable by the terminal apparatus 100 in a storage part such as a memory, and the transmission mode setting part 120 checks whether a piece of transmission mode information received from the base station apparatus 200 is included in the transmission mode information held in the storage part, so as to determine whether it is possible to set to the transmission mode.

Also, as to setting to a particular transmission mode, the terminal apparatus 100 holds a radio parameter group for each transmission mode in a storage part, and the transmission mode setting part 120 reads a radio parameter group corresponding to the transmission mode information received from the base station apparatus 200, and controls the radio transmit and receive part 130 such that the radio transmit and receive part 130 operates according to the radio parameter group.

Instead of the above-mentioned control, or in addition to the above-mentioned control, the terminal apparatus 100 may be provided with radio communication circuits for each transmission mode, and the transmission mode setting part 120 may perform switching to a radio communication circuit of a transmission mode corresponding to the transmission mode information received from the base station apparatus 200 so as to establish the transmission mode.

Figure 4:
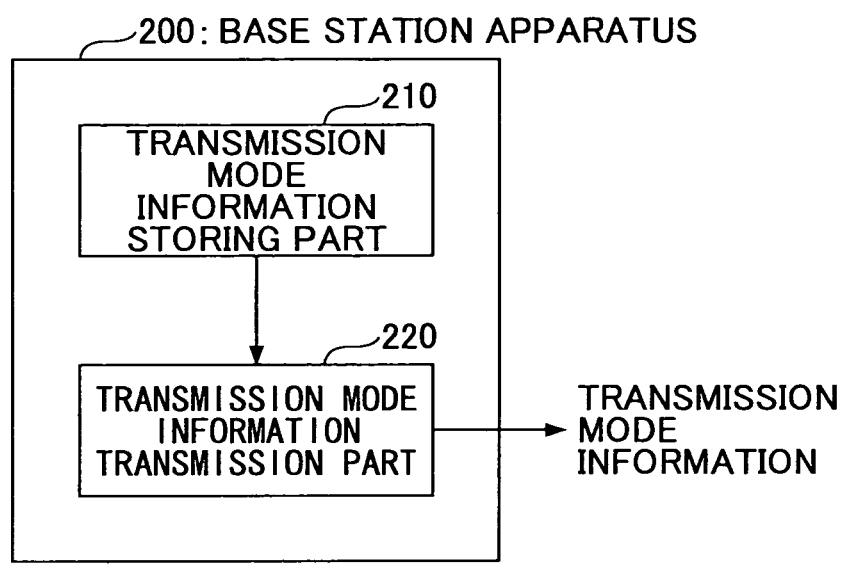
FIG. 4 is a functional block diagram of a base station apparatus 200 according to a first embodiment.

FIG. 4 shows a functional block diagram of the base station apparatus 200 of the first embodiment. As shown in FIG. 4, the base station apparatus 200 includes a transmission mode information storing part 210, and a transmission mode information transmission part 220. FIG. 4 shows only functional parts related to the present invention, and it is needless to say that the base station apparatus 200 includes other functions necessary for performing radio communication as a base station apparatus in a mobile communication system complying with LTE and the like.

The transmission mode information storing part 210 stores, beforehand, transmission mode information corresponding to a region where the base station apparatus 200 is installed. The transmission mode information transmission part 210 is a functional part that reads the transmission information from the transmission mode information storing part 210 and transmits the transmission mode information to the terminal apparatus 100 as broadcast information.

Figure 5:
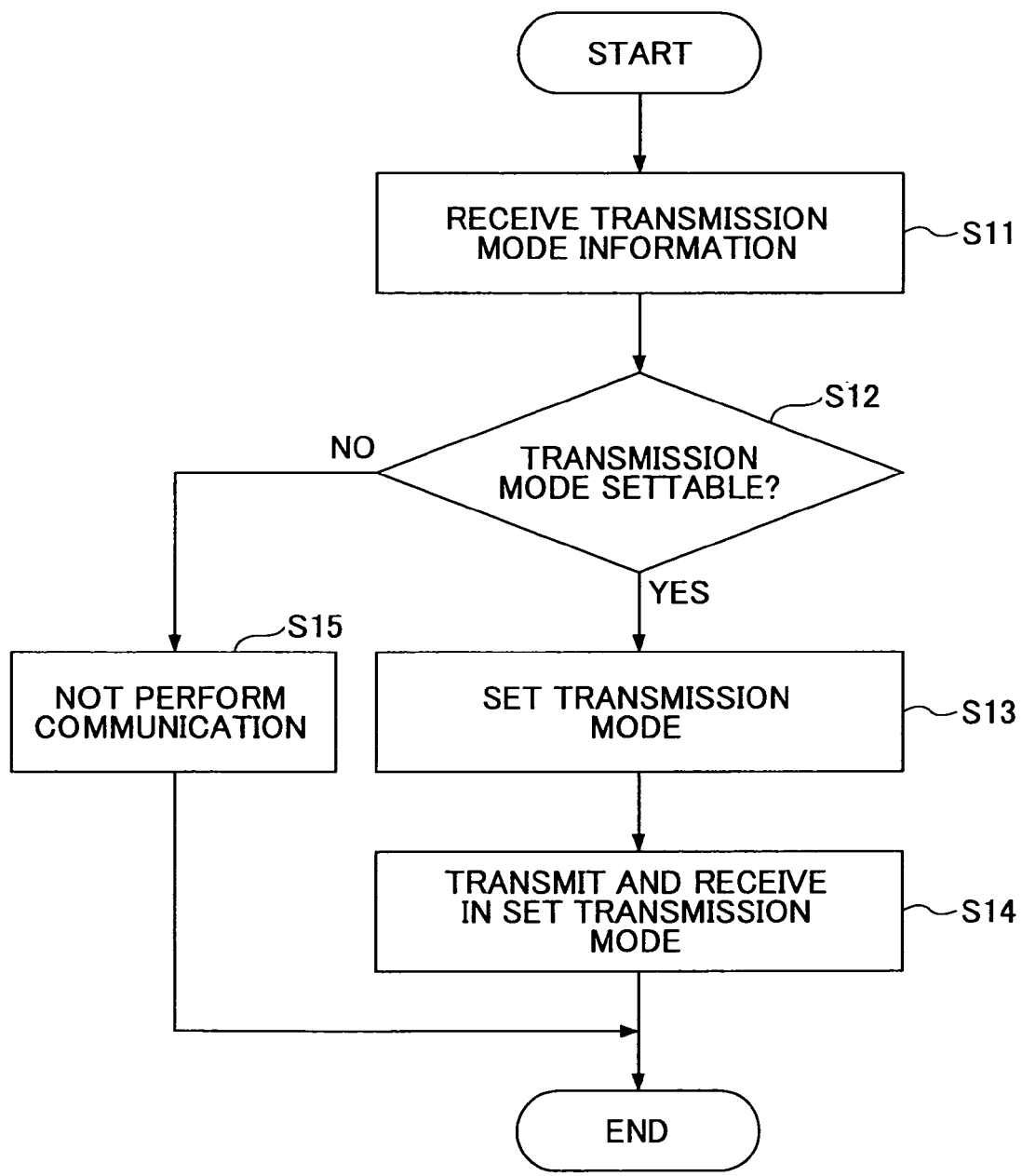
FIG. 5 is a flowchart for explaining operation of the terminal apparatus 100.

Next, operation of the terminal apparatus having the configuration shown in FIG. 3 is described with reference to a flowchart of FIG. 5. FIG. 5 shows operation of receiving transmission mode information one time.

The transmission mode information receiving part 110 periodically receives broadcast information from the base station apparatus 200. When the transmission mode information receiving part 110 receives broadcast information including transmission mode information, the transmission mode information receiving part 110 extracts the transmission mode information from the broadcast information, and passes the transmission mode information to the transmission mode setting part 120 (step 11).

The transmission mode setting part 120 determines whether the transmission mode information received from the transmission mode information receiving part 110 is included in transmission mode information stored in the storage part so as to check whether the terminal apparatus 100 can be set to a transmission mode corresponding to the transmission mode information received from the base station apparatus 200 (step 12).

When it is determined that the transmission mode can be set in step 12, the transmission mode setting part 120 sets the terminal apparatus 100 to the transmission mode (step 13). After that, the radio transmit and receive part 130 performs transmission and reception of signals according to the established transmission mode (step 14).

In the case when it is determined that the transmission mode cannot be set in step 12, the terminal apparatus 100 does not perform communication (step 15). In this case, for example, the terminal apparatus 100 may display a message, on a display device of the terminal apparatus 100 and the like, indicating that communication cannot be performed in the current region.

In a case where a transmission mode that should be set is already set in the terminal apparatus 100 before receiving the transmission mode information, operation of mode switching does not occur in step 13, and communication continues according to the transmission mode in step 14.

Figure 6:
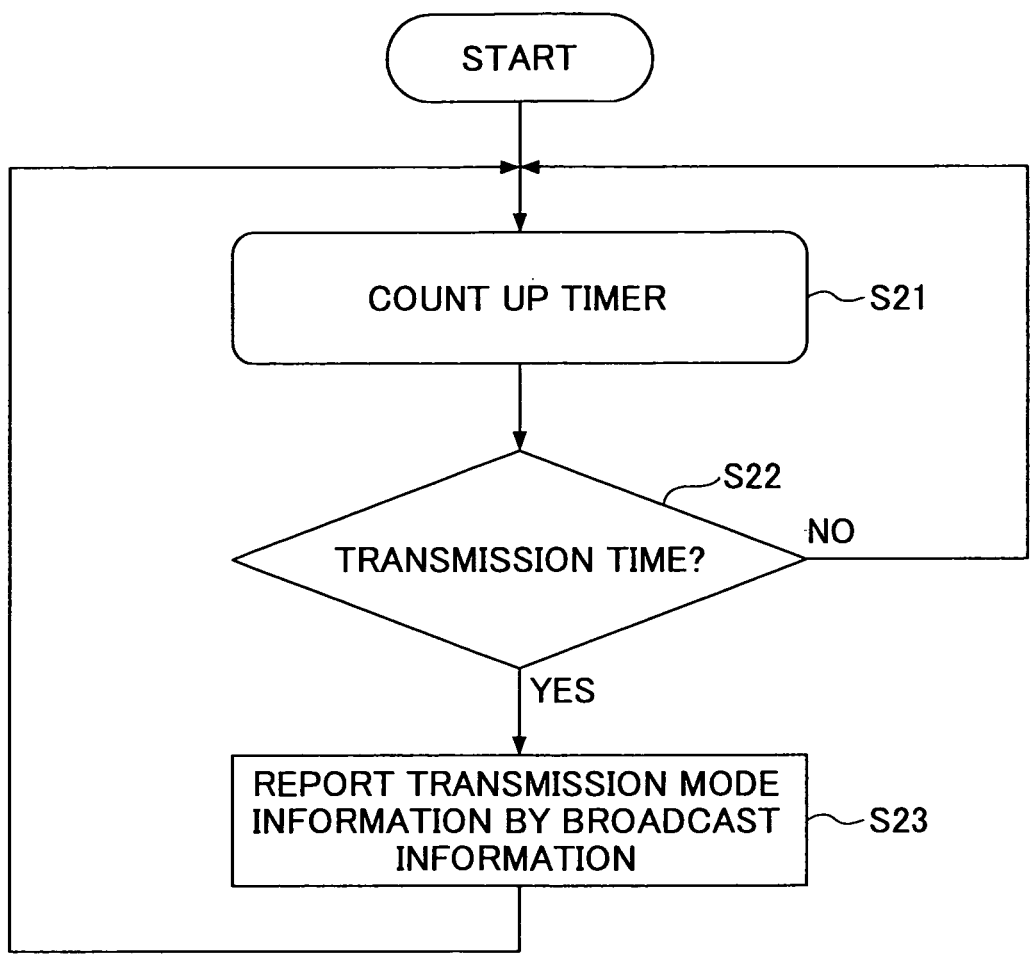
FIG. 6 is a flowchart for explaining operation of the base station apparatus 200 in the first embodiment.

Next, operation of the base station apparatus is described with reference to the flowchart of FIG. 6.

The transmission mode information transmission part 210 of the base station apparatus 200 periodically (cyclically) transmits broadcast information including transmission mode information to the terminal apparatus 100.

After transmitting the broadcast information including the transmission mode information, the transmission mode information transmission part 210 counts up a timer provided in the transmission mode information transmission part 210 for measuring next transmission timing (step 21), and checks whether the current time is the timing for transmitting broadcast information including the transmission mode information (step 22).

If the current time is the timing for transmitting broadcast information including the transmission mode information, the transmission mode information transmission part 220 transmits broadcast information including transmission mode information to the terminal apparatus 100 (step 23).

Second Embodiment

Although the base station apparatus 200 transmits the transmission mode information to the terminal apparatus 100 using the broadcast information in the first embodiment, the transmission mode information may be transmitted to the terminal apparatus 100 by including it in an RRC message. The RRC message is a message used for radio resource setting and the like in connection setting signaling of LTE and the like.

An embodiment of this case is described below as a second embodiment. In the following, description is given mainly for points different from the first embodiment.

(Configuration and Operation of the System)

The system configuration of the second embodiment is the same as that of the first embodiment, which is shown in FIG. 1.

Figure 7:
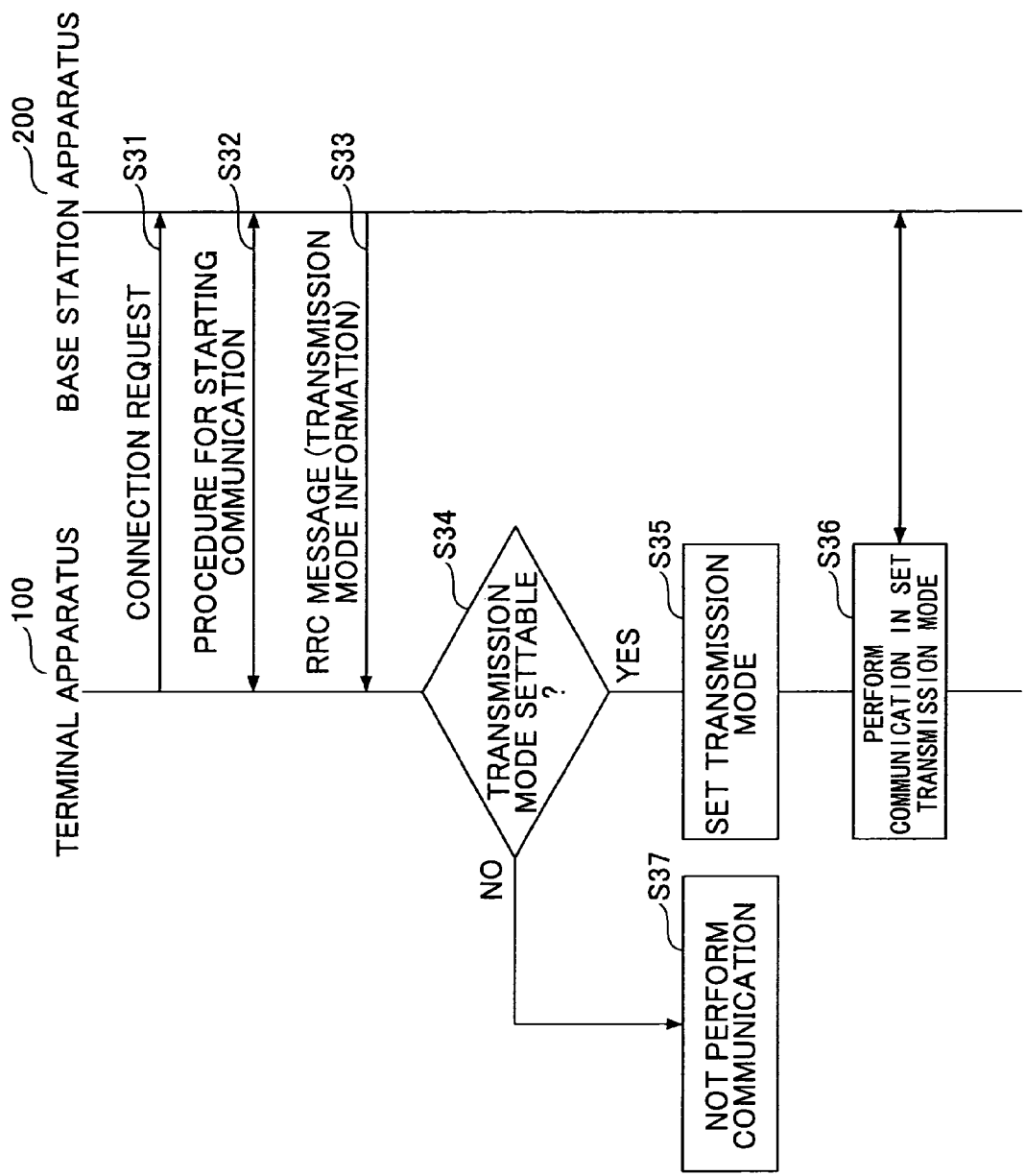
FIG. 7 is a sequence chart for explaining outline of operation of a system in a second embodiment.

Outline of operation of the system of the second embodiment is described with reference to the sequence chart of FIG. 7.

The terminal apparatus 100 transmits a connection request to the base station apparatus 200 by using a channel for access (RACH: Random Access CHannel, for example) (step 31). After that, a predetermined communication procedure is executed for link synchronization and the like necessary for start of communication (step 32).

Then, the base station apparatus 200 transmits an RRC message including transmission mode information to the terminal apparatus 100 (step 33). The terminal apparatus 100 that has received the RRC message including the transmission mode information extracts the transmission mode information from the RRC message. If the transmission mode corresponding to the transmission mode information can be set in the terminal apparatus 100 (Yes in step 34), the terminal apparatus 100 is set to the transmission mode (step 35), and performs communication in the established transmission mode (step 36).

In the case when the terminal apparatus 100 cannot be set to the transmission mode corresponding to the received transmission mode information in step 34, the terminal apparatus 100 does not perform communication (step 37).

In step 31, the terminal apparatus 100 may transmit transmission mode information corresponding to a transmission mode that the terminal apparatus 100 is using (that is currently established) to the base station apparatus 200 by including it in a connection request, for example. Then, only when the transmission mode information is different from predetermined transmission mode information (information of transmission mode that should be set in the terminal apparatus 100) held in the base station apparatus 200, the base station apparatus 200 may transmit transmission mode information, to the terminal apparatus 100, corresponding to the transmission mode that should be set using the RRC message.

(Configuration and Operation of Each Apparatus)

The functional configuration of the terminal apparatus 100 of the second embodiment is the same as that of the first embodiment, which is shown in FIG. 3. However, in the second embodiment, the transmission mode receiving part 110 receives the RRC message, extracts transmission mode information from the RRC message, and passes the transmission mode information to the transmission mode setting part 120. This point is different from the first embodiment. Also, operation for transmission mode setting is basically similar to operation in the first embodiment shown in FIG. 5. In the second embodiment, the transmission mode information is received by the RRC message in step 11, which is different from the first embodiment.

Figure 8:
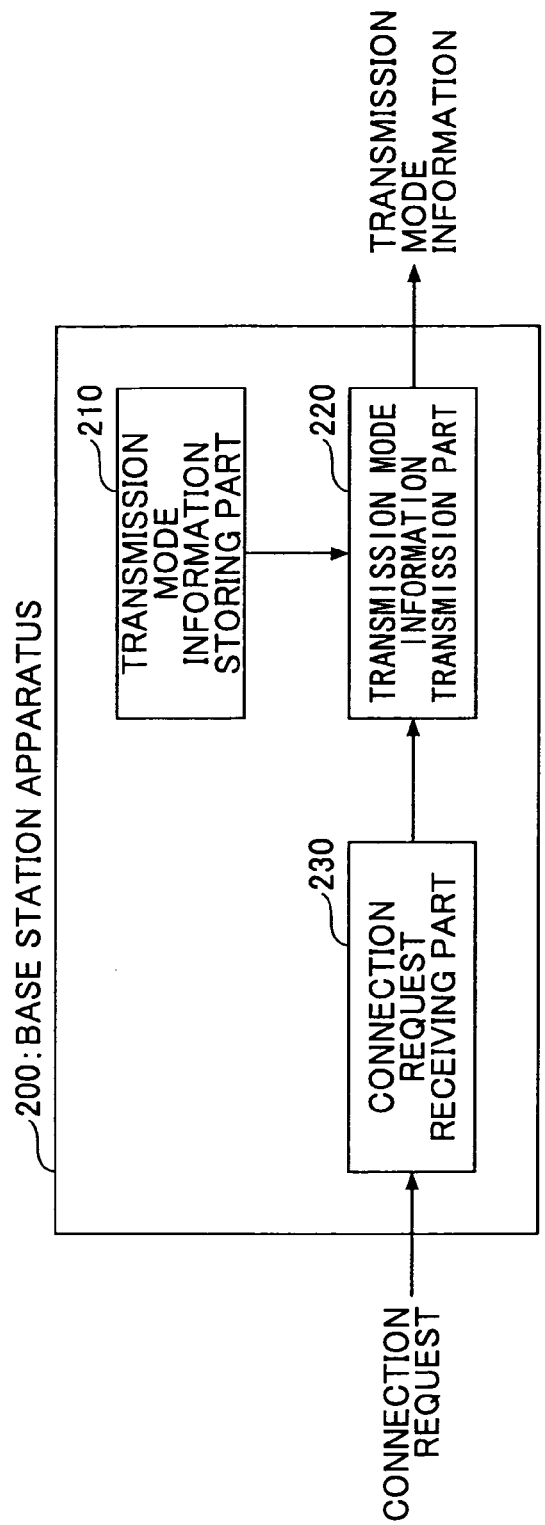
FIG. 8 is a functional block diagram of the base station apparatus 200 in the second embodiment.

FIG. 8 shows a functional block diagram of the base station apparatus 200 of the second embodiment. As shown in FIG. 8, the base station apparatus 200 includes a connection request receiving part 230 in addition to the transmission mode information storing part 210 and the transmission mode information transmission part 220.

FIG. 8 shows only functional parts related the present invention, and it is needless to say that the base station apparatus 200 includes other functions necessary for performing radio communication as a base station apparatus in a mobile communication system complying with LTE and the like. Although the base station apparatus 200 of the first embodiment includes a functional part for receiving a connection request, since reception of a connection request relates to transmission of transmission mode information in the second embodiment, the functional part is shown as the connection request receiving part 230 in FIG. 8.

The connection request receiving part 230 is a functional part that receives a connection request from the terminal apparatus 100, and notifies the transmission mode information transmission part 220 that the connection request is received. The transmission mode information storing part 210 stores transmission mode information corresponding to a region where the base station apparatus 200 is installed.

The transmission mode information transmission part 220 is a functional part that reads the transmission mode information from the transmission mode information storing part 210, and transmits an RRC message including the transmission mode information to the terminal apparatus 100.

Figure 9:
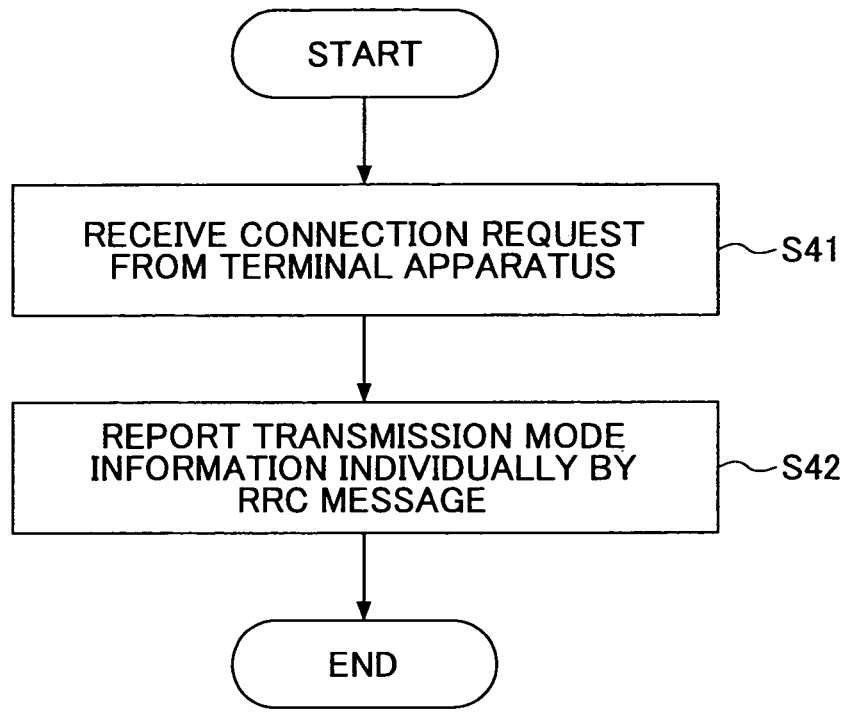
FIG. 9 is a flowchart for explaining operation of the base station apparatus 200 in the second embodiment.

Next, operation of the base station apparatus 200 is described with reference to the flowchart of FIG. 9.

When receiving a connection request from the terminal apparatus 100, the connection request receiving part 230 notifies the transmission mode information transmission part 220 of the reception of the connection request (step 41).

Then, the transmission mode information transmission part 220 reads transmission mode information from the transmission mode information storing part 210, and transmits the transmission mode information, by including it in an RRC message, to the terminal apparatus 100 that is a transmission source of the connection request (step 42).

In the case when the terminal apparatus 100 transmits transmission mode information that is being used to the base station apparatus 100 when performing connection request, the connection request receiving part 230 checks whether transmission mode information included in the connection request is the same as transmission mode information stored in the transmission mode information storing part 210, and reports the checking result to the transmission mode information transmission part 220. Then, when transmission mode information being used in the terminal apparatus 100 is different from the transmission mode information stored in the transmission mode information storing part 210, the transmission mode information transmission part 220 transmits transmission mode information to the terminal apparatus 100 by including it in the RRC message. The transmission mode information transmission part 220 may check whether the transmission mode information included in the connection request is the same as the transmission mode information stored in the transmission mode information storing part 220.

Also, each of the terminal apparatus 100 and the base station apparatus 200 may include the functions of the second embodiment in addition to the functions of the first embodiment. In that case, reporting of the transmission mode information by using the broadcast information may be performed in addition to the reporting of the transmission mode information by using the RRC message, or, reporting of the transmission mode information by using the broadcast information and the reporting of the transmission mode information by using the RRC message may be switched according to a setting.

As mentioned above, according to the technique described in the embodiments of the present invention, it becomes possible to cause a terminal apparatus used in a mobile communication system to operate in a particular transmission mode among a plurality of transmission modes, so that the terminal apparatus belonging to a base station apparatus installed in a region can be set to a transmission mode complying with stipulations of the region. Accordingly, the terminal apparatus can perform radio transmission that satisfies radio transmission requirements including radio transmission requirements on the maximum transmission power and the out-of-band radiation, in which the radio transmission requirements comply with the region and comply with the standard defined in 3GPP and the like. Further, similarly to the transmission conditions, it becomes also possible to establish restriction in a corresponding region such that, by reporting reception performance conditions that comply with the standard defined in 3GPP and the like, the terminal apparatus that can perform reception operation satisfying the conditions can use the network.

Also, according to the embodiment of the present invention, instead of reporting each radio parameter corresponding to a transmission mode, transmission mode information corresponding to a transmission mode is reported. Thus, the number of bits necessary for the reporting can be reduced so that the overhead can be reduced.

The present invention is not limited to the specifically disclosed embodiments, and variations and modifications may be made within the scope of the claims.

The present international application claims priorities based on Japanese patent application No. 2010-105994, filed in the JPO on Apr. 30, 2010, and Japanese patent application No. 2010-110378, filed in the JPO on May 12, 2010, and the entire contents of the Japanese patent applications No. 2010-105994 and No. 2010-110378 are incorporated herein by reference.

DESCRIPTION OF REFERENCE SIGNS 1000 mobile communication system
50 cell
100 terminal apparatus
200 base station apparatus
300 access gateway apparatus
400 core network
110 transmission mode information receiving part
120 transmission mode setting part
130 radio transmit and receive part
210 transmission mode information storing part
220 transmission mode information transmission part
230 connection request receiving part

The invention claimed is:

1. A terminal apparatus that performs radio communication with a base station apparatus in a mobile communication system, comprising:
   a transmission mode information receiving unit configured to receive transmission mode information, from the base station apparatus, corresponding to a transmission mode, on a radio transmission requirement of a maximum transmission power and out-of-band radiation, that should be set in the terminal apparatus;
   a transmission mode setting unit configured to set the terminal apparatus to the transmission mode if the terminal apparatus can perform radio transmission in the transmission mode corresponding to the transmission mode information received by the transmission mode receiving unit; and
   a radio transmission unit configured to perform radio transmission in the transmission mode.

2. The terminal apparatus as claimed in claim 1, wherein the transmission mode information receiving unit receives the transmission mode information by broadcast information from the base station apparatus.

3. The terminal apparatus as claimed in claim 2, the terminal apparatus comprising a storage unit configured to store one or a plurality of pieces of transmission mode information,
   wherein the transmission mode setting unit determines whether a piece of transmission mode information received by the transmission mode receiving unit exists in the one or a plurality of pieces of transmission mode information, and if it exists, the transmission mode setting unit determines that the terminal apparatus can perform radio transmission in the transmission mode corresponding to the transmission mode information received by the transmission mode information receiving unit.

4. The terminal apparatus as claimed in claim 2, wherein the transmission mode is a mode in which radio transmission is performed such that predetermined radio transmission requirements including radio transmission requirements on maximum transmission power and out-of-band radiation are satisfied.

5. The terminal apparatus as claimed in claim 2, wherein the transmission mode information is associated with a radio reception performance condition, and
   the terminal apparatus that receives the transmission mode information performs reception operation so as to satisfy the radio reception performance condition corresponding to the transmission mode information.

6. The terminal apparatus as claimed in claim 2, wherein, in a case when the transmission mode information is not reported from the base station apparatus, the terminal apparatus performs radio transmission in a transmission mode corresponding to transmission mode information that is stored in the terminal apparatus beforehand.

7. The terminal apparatus as claimed in claim 1, wherein the transmission mode information receiving unit receives the transmission mode information from the base station apparatus by a message used for connection setting signaling.

8. The terminal apparatus as claimed in claim 7, the terminal apparatus comprising a storage unit configured to store one or a plurality of pieces of transmission mode information,
wherein the transmission mode setting unit determines whether a piece of transmission mode information received by the transmission mode receiving unit exists in the one or a plurality of pieces of transmission mode information, and if it exists, the transmission mode setting unit determines that the terminal apparatus can perform radio transmission in the transmission mode corresponding to the transmission mode information received by the transmission mode information receiving unit.

9. The terminal apparatus as claimed in claim 7, wherein the transmission mode is a mode in which radio transmission is performed such that predetermined radio transmission requirements including radio transmission requirements on maximum transmission power and out-of-band radiation are satisfied.

10. The terminal apparatus as claimed in claim 7, wherein the transmission mode information is associated with a radio reception performance condition, and
the terminal apparatus that receives the transmission mode information performs reception operation so as to satisfy the radio reception performance condition corresponding to the transmission mode information.

11. The terminal apparatus as claimed in claim 7, wherein, in a case when the transmission mode information is not reported from the base station apparatus, the terminal apparatus performs radio transmission in a transmission mode corresponding to transmission mode information that is stored in the terminal apparatus beforehand.

12. The terminal apparatus as claimed in claim 1, the terminal apparatus comprising a storage unit configured to store one or a plurality of pieces of transmission mode information,
wherein the transmission mode setting unit determines whether a piece of transmission mode information received by the transmission mode receiving unit exists in the one or a plurality of pieces of transmission mode information, and if it exists, the transmission mode setting unit determines that the terminal apparatus can perform radio transmission in the transmission mode corresponding to the transmission mode information received by the transmission mode information receiving unit.

13. The terminal apparatus as claimed in claim 1, wherein the transmission mode is a mode in which radio transmission is performed such that predetermined radio transmission requirements including radio transmission requirements on maximum transmission power and out-of-band radiation are satisfied.

14. The terminal apparatus as claimed in claim 1, wherein the transmission mode information is associated with a radio reception performance condition, and
the terminal apparatus that receives the transmission mode information performs reception operation so as to satisfy the radio reception performance condition corresponding to the transmission mode information.

15. The terminal apparatus as claimed in claim 1, wherein, in a case when the transmission mode information is not reported from the base station apparatus, the terminal apparatus performs radio transmission in a transmission mode corresponding to transmission mode information that is stored in the terminal apparatus beforehand.

16. A base station apparatus that performs radio communication with a terminal apparatus in a mobile communication system, comprising:
a transmission mode information storing unit configured to store transmission mode information corresponding to a transmission mode, on a radio transmission requirement of a maximum transmission power and out-of-band radiation, that should be set in the terminal apparatus; and
a transmission mode information transmission unit configured to read the transmission mode information from the transmission mode information storing unit, and to transmit the transmission mode information to the terminal apparatus.

17. The base station apparatus as claimed in claim 16, wherein the transmission mode information transmission unit transmits the transmission mode information to the terminal apparatus by broadcast information.

18. The base station apparatus as claimed in claim 17, wherein the transmission mode is a mode in which the terminal apparatus performs radio transmission so as to satisfy predetermined radio transmission requirements including radio transmission requirements on maximum transmission power and out-of-band radiation.

19. The base station apparatus as claimed in claim 17, wherein the transmission mode information is associated with a radio reception performance condition, and
the terminal apparatus that receives the transmission mode information performs reception operation so as to satisfy the radio reception performance condition corresponding to the transmission mode information.

20. The base station apparatus as claimed in claim 16, wherein the transmission mode information transmission unit transmits the transmission mode information to the terminal apparatus by a message that is used for a connection setting signaling.

21. The base station apparatus as claimed in claim 20, the base station apparatus comprising a receiving unit configured to receive, from the terminal apparatus, transmission mode information corresponding to a transmission mode that is set in the terminal apparatus,
wherein, if the transmission mode information received by the receiving unit is different from transmission mode information stored in the transmission mode information storing unit, the transmission mode information transmission unit transmits the transmission mode information stored in the transmission mode information storing unit to the terminal apparatus.

22. The base station apparatus as claimed in claim 21, wherein the transmission mode is a mode in which the terminal apparatus performs radio transmission so as to satisfy predetermined radio transmission requirements including radio transmission requirements on maximum transmission power and out-of-band radiation.

23. The base station apparatus as claimed in claim 21, wherein the transmission mode information is associated with a radio reception performance condition, and
the terminal apparatus that receives the transmission mode information performs reception operation so as to satisfy the radio reception performance condition corresponding to the transmission mode information.

24. The base station apparatus as claimed in claim 20, wherein the transmission mode is a mode in which the terminal apparatus performs radio transmission so as to satisfy predetermined radio transmission requirements including radio transmission requirements on maximum transmission power and out-of-band radiation.

25. The base station apparatus as claimed in claim 20, wherein the transmission mode information is associated with a radio reception performance condition, and
the terminal apparatus that receives the transmission mode information performs reception operation so as to satisfy the radio reception performance condition corresponding to the transmission mode information.

26. The base station apparatus as claimed in claim 16, wherein the transmission mode is a mode in which the terminal apparatus performs radio transmission so as to satisfy predetermined radio transmission requirements including radio transmission requirements on maximum transmission power and out-of-band radiation.

27. The base station apparatus as claimed in claim 16, wherein the transmission mode information is associated with a radio reception performance condition, and
the terminal apparatus that receives the transmission mode information performs reception operation so as to satisfy the radio reception performance condition corresponding to the transmission mode information.

28. A mobile communication system including a base station apparatus and a terminal apparatus,
the base station apparatus comprising:
a transmission mode information storing unit configured to store transmission mode information corresponding to a transmission mode, on a radio transmission requirement of a maximum transmission power and out-of-band radiation, that should be set in the terminal apparatus; and
a transmission mode information transmission unit configured to read the transmission mode information from the transmission mode information storing unit, and to transmit the transmission mode information to the terminal apparatus,
the terminal apparatus comprising:
a transmission mode information receiving unit configured to receive transmission mode information, from the base station apparatus, a transmission mode setting unit configured to set the terminal apparatus to the transmission mode if the terminal apparatus can perform radio transmission in the transmission mode corresponding to the transmission mode information received by the transmission mode receiving unit; and
a radio transmission unit configured to perform radio transmission in the transmission mode.

29. A transmission mode setting method in a mobile communication system including a base station apparatus and a terminal apparatus, wherein
the base station apparatus reads transmission mode information from a transmission mode information storing unit that stores the transmission mode information corresponding to a transmission mode, on a radio transmission requirement of a maximum transmission power and out-of-band radiation, that should be set in the terminal apparatus, and transmits the transmission mode information to the terminal apparatus, and
the terminal apparatus receives the transmission mode information from the base station apparatus, and if the terminal apparatus can perform radio transmission in a transmission mode corresponding to the received transmission mode information, the terminal apparatus sets the terminal apparatus to the transmission mode.

* * * * *